(12) United States Patent
Kishimoto (10) Patent No.: US 8,169,177 B2
(45) Date of Patent: May 1, 2012

(54) ELECTRIC VEHICLE

(75) Inventor: Takeshi Kishimoto, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 461 days.

(21) Appl. No.: 12/312,872

(22) PCT Filed: Mar. 7, 2008

(86) PCT No.: PCT/JP2008/054682
§ 371 (c)(1),
(2), (4) Date: May 29, 2009

(87) PCT Pub. No.: WO2008/126629
PCT Pub. Date: Oct. 23, 2008

(65) Prior Publication Data
US 2010/0027170 A1    Feb. 4, 2010

(30) Foreign Application Priority Data

Mar. 26, 2007 (JP) ................. 2007-079533

(51) Int. Cl.
*H02K 11/00* (2006.01)
(52) U.S. Cl. ........ 318/490; 318/558; 318/434; 318/432; 318/811; 318/400.25; 363/71; 363/72; 363/132; 363/96; 363/56.12; 62/228.4; 62/29; 361/31; 361/33; 180/65.21; 180/65.285
(58) Field of Classification Search .............. 318/434, 318/400.3, 455, 433, 432, 430, 807, 801, 318/400.01, 400.1, 599, 685, 811, 476, 71, 318/472, 400.25, 362; 363/71, 72, 132, 37, 363/36, 41, 49, 96, 97, 56.12; 180/65.1–65.285; 322/10, 15, 46; 62/228.4, 229; 361/31, 33
See application file for complete search history.

(56) References Cited

U.S. PATENT DOCUMENTS

| 6,324,038 | B1 | 11/2001 | Kishibe et al. | |
|---|---|---|---|---|
| 7,109,605 | B2 | 9/2006 | Habu | |
| 7,245,094 | B2 * | 7/2007 | Shinmura et al. | 318/139 |

(Continued)

FOREIGN PATENT DOCUMENTS

JP    A-6-217533    8/1994

(Continued)

OTHER PUBLICATIONS

International Preliminary Report on Patentability mailed on Jan. 28, 2010 in corresponding International Application No. PCT/JP2008/054682.

*Primary Examiner* — Walter Benson
*Assistant Examiner* — Jorge Carrasquillo
(74) *Attorney, Agent, or Firm* — Oliff & Berridge, PLC (57) ABSTRACT

An electric vehicle includes a control unit having overcurrent generation judgment unit, inverter selection unit, and inverter drive control unit. The overcurrent generation judgment unit judges whether an overcurrent is generated in an inverter for generation or an inverter for travel. When an overcurrent is generated in one of the inverters, the inverter selection unit selects the other inverter to be driven. The inverter drive control unit stops the driving of the one inverter and drives the other inverter to drive a travel motor or a generator.

6 Claims, 6 Drawing Sheets

U.S. PATENT DOCUMENTS

| | | | |
|---|---|---|---|
| 7,581,606 B2 * | 9/2009 | Ishikawa et al. | 180/65.21 |
| 8,054,026 B2 * | 11/2011 | Shimana et al. | 318/490 |
| 2006/0164034 A1 * | 7/2006 | Hanyu et al. | 320/104 |
| 2007/0070667 A1 * | 3/2007 | Stancu et al. | 363/132 |

FOREIGN PATENT DOCUMENTS

| | | |
|---|---|---|
| JP | A-2000-287493 | 10/2000 |
| JP | A-2004-112883 | 4/2004 |
| JP | 2005130615 A * | 5/2005 |
| JP | A-2005-130615 | 5/2005 |
| JP | A-2006-197717 | 7/2006 |
| JP | 2007028733 A * | 2/2007 |
| JP | A-2007-28733 | 2/2007 |
| JP | A-2008-13119 | 1/2008 |
| WO | WO 2006064662 A1 * | 6/2006 |
| WO | WO 2008/004418 A1 | 1/2008 |

* cited by examiner

ELECTRIC VEHICLE

TECHNICAL FIELD

The present invention relates to an electric vehicle including a plurality of inverters which are connected to a plurality of motors to drive wheels and which are connected in parallel to a DC power source.

TECHNICAL BACKGROUND

It has heretofore been known that, in an electric vehicle such as an electric automobile or a hybrid car equipped with a motor, an inverter and a motor control unit are provided between the motor and a power supply unit, and a motor current which is a driving signal is sent to the motor by the inverter to drive the motor. The inverter converts DC power from the power supply unit into an alternating current in accordance with a torque command value, and sends the resultant motor current to the motor. Further, the motor control unit sends, to the inverter, a control signal for generating the motor current.

As one such electric vehicle, there has heretofore been a hybrid vehicle including a control unit, and a first motor generator (MG1) and a second motor generator (MG2) which are two motors connected to two inverters, respectively. Some such hybrid vehicles have been configured to perform a so-called "ready-off". In a ready-off, the control unit stops the driving of both of the two motor generators to decrease a motor load factor when an overcurrent is generated in one of the inverters, and, after the overcurrent has disappeared, the control unit resumes driving of both of the inverters. Afterward, when an overcurrent is generated again, the control unit again stops driving both the inverters to further decrease the motor load factor. This operation may be repeated, for example, four times. After four repetitions, the control unit stops the driving of both inverters. Here, "motor load factor" refers to the ratio of an allowable maximum torque command value of the motor to a generatable maximum torque of the motor. Therefore, a decrease in the motor load factor corresponds to a decrease in the overall driving force of the vehicle.

Furthermore, Japanese Patent Publication Laid-open No. 2004-112883 describes a hybrid car including a control unit and two inverters which are connected in parallel to a DC power source and to two motors, AC motors M1, M2. When one of the two inverters abnormally stops, the control unit forces the other inverter to also stop. Moreover, after having compulsorily stopped the second inverter, the control unit releases that inverter from the forced stop when the level of a voltage output from a voltage sensor is stabile after a predetermined period of time.

The conventional hybrid vehicle described above includes the two inverters, the first motor generator (MG1) and the second motor generator (MG2), and the control unit. The control unit stops the driving of both of the two motor generators to decrease the motor load factor when an overcurrent is generated in one of the inverters. Moreover, after the overcurrent has disappeared, the control unit resumes the driving of both of the inverters. Subsequently, should overcurrent reoccur, the control unit again stops driving both the inverters to decrease the motor load factor. This operation is continuously repeated. Because the generation of the overcurrent is successively repeated in the inverter when one of the inverters is broken, the motor load factor might gradually decrease even if the driving of the inverters is resumed, until, ultimately, sufficient running performance of the vehicle might not be obtained. For example, the motor load factor might decrease to such a degree that sufficient acceleration force is not obtained, or neither of the two motor generators might be driven. Therefore, when the overcurrent is generated in the inverter, a driver might only be able to coast the vehicle, even if the driver only attempts to drive the vehicle to the side of a road or to, for example, an automobile repair shop. Accordingly, there remained a need to enable effective safe driving for evacuation.

Furthermore, the hybrid car described in Japanese Patent Publication Laid-open No. 2004-112883 does not include unit for selecting an inverter to be driven when an overcurrent is generated in an inverter, and for controlling the inverter to only drive the selected one of the plurality of inverters so that the motor corresponding to the selected inverter may be driven, and wheels are driven by the motor corresponding to the selected inverter when the overcurrent is generated in one of the inverters. The hybrid car described in Japanese Patent Publication Laid-open No. 2004-112883 therefore there is room for improvement to enable effective safe driving for evacuation to the side of a road or to, for example, an automobile repair shop when the overcurrent is generated in one of the plurality of inverters.

DISCLOSURE OF THE INVENTION

The present invention provides an electric vehicle wherein safe driving for evacuation of the vehicle can effectively be accomplished when an overcurrent is generated in one of a plurality of inverters.

An electric vehicle according to the present invention is characterized by including a plurality of inverters which are connected to a plurality of motors to drive wheels and which are connected in parallel to a DC power source; overcurrent generation judgment unit for judging whether an overcurrent is generated in one of the plurality of inverters in accordance with detected current values for the plurality of inverters; inverter selection unit for selecting an inverter to be driven when it is judged that an overcurrent is generated in one of the plurality of inverters; and inverter drive control unit for controlling the inverters to only drive the inverter selected from the plurality of inverters so that the motor corresponding to the selected inverter is driven, wherein, when the overcurrent is generated in one of the inverters, the wheels are driven by the motor corresponding to the selected inverter.

Preferably, the plurality of motors are a first motor generator and a second motor generator, and the plurality of inverters are a first motor generator inverter and a second motor generator inverter. The electric vehicle further includes a planetary gear mechanism in which a pinion gear is toothed between a sun gear and a ring gear, an engine, and an output shaft which outputs power toward the wheels. The first motor generator is coupled to the sun gear, a rotary shaft of the engine is coupled to a member which supports the pinion gear, an output shaft to which auxiliary power is imparted by the second motor generator is coupled to the ring gear, and the inverter selection unit is configured to select one of the first motor generator inverter and the second motor generator inverter as the inverter to be driven when the overcurrent is generated in the other of the first motor generator inverter and the second motor generator inverter.

Furthermore, preferably, the inverter drive control unit stops the driving of one of the plurality of inverters when the overcurrent is generated in one of the inverters a predetermined number of times in succession, that is, repetitively.

Still further, preferably, when the overcurrent is generated in one of the plurality of inverters a predetermined number of times in succession, that is, repetitively, the inverter drive control unit stops the driving of all of the plurality of inverters to decrease a motor load factor, and then only resumes the driving of the other inverter of the plurality of inverters which the overcurrent isn't generated, the above motor load factor being a ratio of an allowable maximum torque command value of the motors to a generatable maximum torque of the motors which are driven by the plurality of inverters.

Still further, preferably, when the overcurrent is generated in one of the plurality of inverters less than a predetermined number of times, the inverter drive control unit stops the driving of all of the plurality of inverters to decrease the motor load factor, and then resumes the driving of all of the plurality of inverters, the above motor load factor being a ratio of the allowable maximum torque command value of the motors to the generatable maximum torque of the motors which are driven by the plurality of inverters.

According to the electric vehicle of the present invention, when the overcurrent is generated in one of the plurality of inverters, the driving of one of the inverters is stopped, and the motor is driven by the inverter in which no overcurrent is generated, so that the wheels can be driven by the driven motor. This makes it possible to effectively achieve safe driving for evacuation when the vehicle is driven for the evacuation to cope with the generation of the overcurrent in one of the inverters.

Furthermore, the plurality of motors may be a first motor generator and a second motor generator, the plurality of inverters are a first motor generator inverter and a second motor generator inverter, and the electric vehicle may further includes a planetary gear mechanism in which a pinion gear is toothed between a sun gear and a ring gear, an engine, and an output shaft which outputs power toward the wheels, wherein the first motor generator is coupled to the sun gear, a rotary shaft of the engine is coupled to a member which supports the pinion gear, an output shaft to which auxiliary power is imparted by the second motor generator is coupled to the ring gear, and the inverter selection unit selects one of the first motor generator inverter and the second motor generator inverter as the inverter to be driven when the overcurrent is generated in the other of the first motor generator inverter and the second motor generator inverter. With such a constitution, if the corresponding motor generator is driven by the first motor generator inverter or the second motor generator inverter, the corresponding motor generator can impart power to the output shaft. This makes it possible to enable safe driving for evacuation of the vehicle effectively, even when an overcurrent is generated in one of either the first motor generator inverter or the second motor generator inverter.

Still further, when an overcurrent is generated in one of the inverters a predetermined number of times in succession, the inverter drive control unit may stop the driving of one of the plurality of inverters. When the overcurrent is generated in one of the plurality of inverters less than a predetermined number of times, the inverter drive control unit may stop the driving of all of the plurality of inverters to decrease a motor load factor, and then may resume the driving of all of the plurality of inverters, the above motor load factor being a ratio of an allowable maximum torque command value of the motors to a generatable maximum torque of the motors which are driven by the plurality of inverters. According to these constitutions, after the generation of the overcurrent in one of the inverters, the driving of one of the inverters can be resumed when the number of times that the overcurrent is generated is less than a predetermined number of times. This makes it possible to provide an opportunity for the operation of a inverter which is not broken return to normal, and to thereby prevent unnecessary stop of driving of a normally-operating inverter.

DESCRIPTION OF REFERENCE NUMBERS

10: hybrid vehicle, 12: engine, 14: generator (MG1), 16: travel motor (MG2), 18: crank shaft, 20: damper, 22: power divider, 24: reduction gear unit, 26: output shaft, 28: sun gear, 30: ring gear, 32: pinion gear, 34: carrier, 36: front sun gear, 38: rear sun gear, 40: long pinion gear, 42: short pinion gear, 44: second ring gear, 46: second carrier, 48: first brake, 50: second brake, 52: propeller shaft, 54: differential gear, 56: rear wheels, 58: generator (MG1) inverter, 60: travel motor (MG2) inverter, 62: electric load device, 64: DC power source, 66 system relay, 68 system relay, 70: first condenser, 72: second condenser, 74: DC/DC converter, 76: control unit, 78: inverter current sensor, 80: inverter current sensor, 82: motor torque control unit, 84: overcurrent generation judgment unit, 86: inverter selection unit, and 88: inverter drive control unit.

DESCRIPTION OF EXEMPLARY EMBODIMENTS

Figure 1:
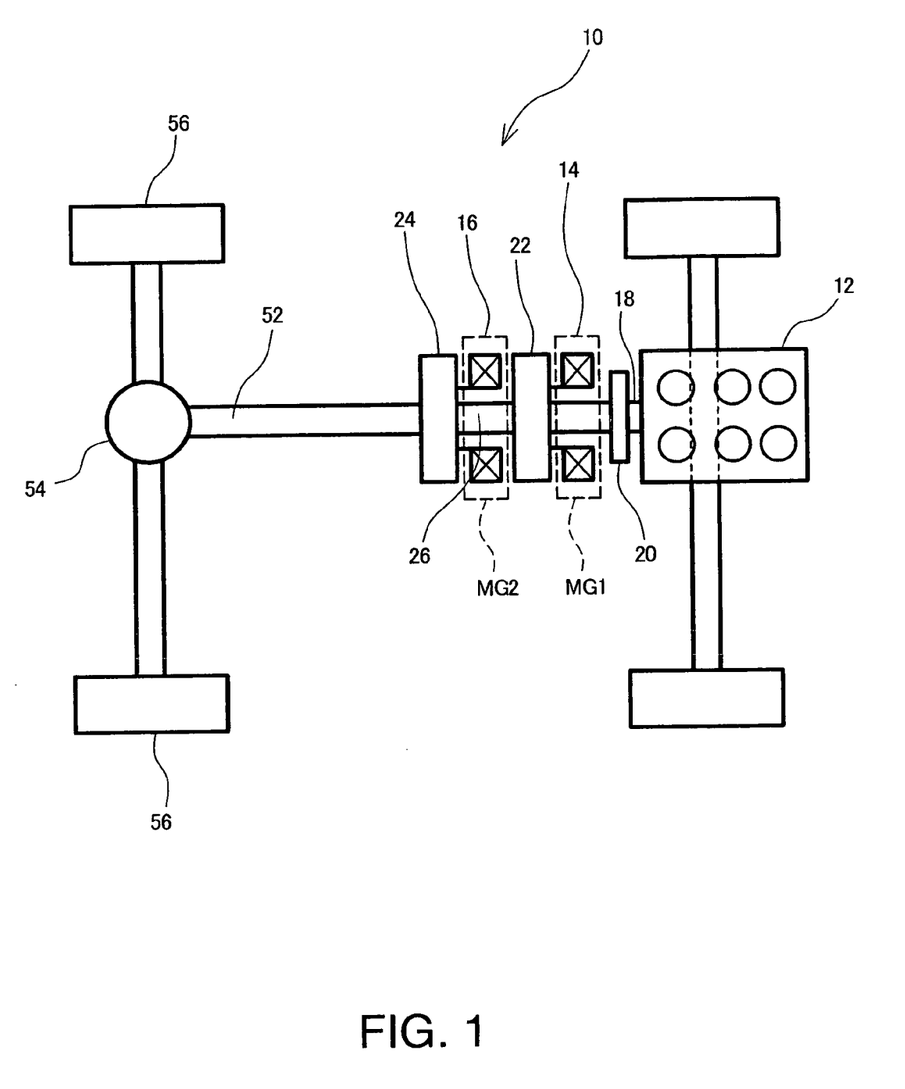
FIG. 1 is a schematic diagram of a hybrid electric vehicle according to an embodiment of the present invention.

An embodiment according to the present invention will hereinafter be described in detail with reference to the drawings. FIG. 1 to FIG. 7 show one example of an embodiment according to the present invention. FIG. 1 is a schematic diagram of a hybrid vehicle 10, which is the electric vehicle of the present embodiment. The hybrid vehicle 10 is an FR vehicle which is a front engine rear-wheel-drive vehicle. The hybrid vehicle 10 includes an engine 12, a generator (MG1) 14 which is a first motor generator, and a travel motor (MG2) 16 which is a second motor generator. The generator 14 and the travel motor 16 correspond to the motors recited in claims.

Furthermore, in the hybrid vehicle 10, a power divider 22 is coupled to a crank shaft of the engine 12 via a damper 20, and a rotary shaft of the generator 14 and an output shaft 26 of a reduction gear unit 24 with a two-speed transmission mechanism are coupled to the power divider 22. Further, a rotary shaft of the travel motor 16 is coupled to the reduction gear unit 24.

Figure 2:
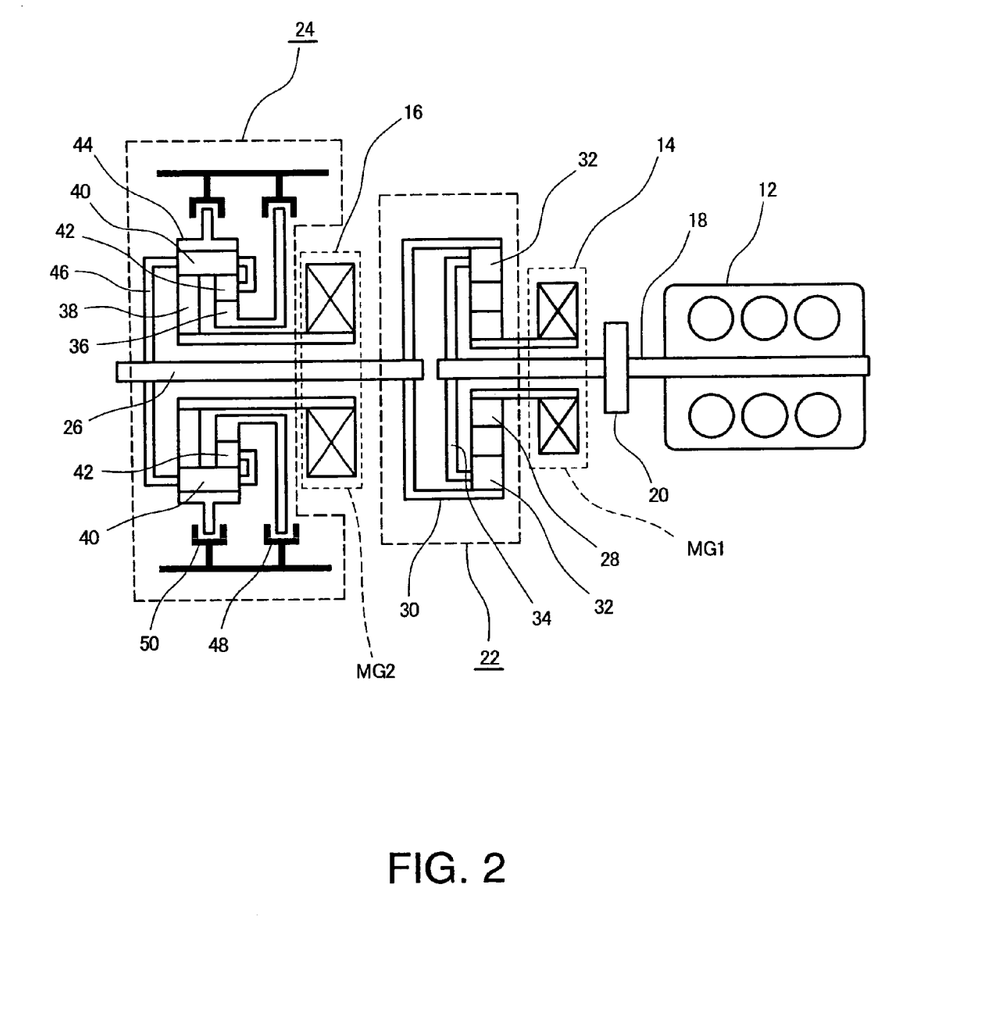
FIG. 2 is a diagram showing in detail the constitution of a part for transmitting the power of an engine, a generator (MG1) and a travel motor (MG2)

FIG. 2 is a diagram showing in detail the constitution of a part for transmitting the power of the engine 12, the generator 14 and the travel motor 16 shown in FIG. 1. As shown in FIG. 2, the power divider 22 is a planetary gear mechanism including a sun gear 28, a ring gear 30 disposed around the sun gear 28, a plurality of pinion gears 32 to tooth with the sun gear 28 and the ring gear 30, and a carrier 34 for supporting the plurality of pinion gears 32 rotatably on their axes and rotatably around a axis of the carrier 34. The crank shaft 18, which is a rotary shaft of the engine 12, is coupled to the carrier 34 via the damper 20, and the rotary shaft of the generator 14 is coupled to the sun gear 28. Further, the ring gear 30 is coupled to the output shaft 26 for outputting power toward rear wheels 56 (FIG. 1).

Referring again to FIG. 2, the generator 14 is a three-phase AC motor, and can also be used as a motor for starting the engine 12. However, when the generator 14 is used as a generator, torque from the engine 12 input from the carrier 34 is distributed by the power divider 22 toward the sun gear 28 and toward the ring gear 30.

Furthermore, the reduction gear unit 24 is a compound planetary gear mechanism including a front sun gear 36, a rear sun gear 38, a long pinion gear 40, a short pinion gear 42, a second ring gear 44 and a second carrier 46. The short pinion gear 42 engages with the front sun gear 36 and the long pinion gear 40. The long pinion gear 40 engages with the rear sun gear 38, the short pinion gear 42 and the second ring gear 44. Further, the reduction gear unit 24 includes a first brake 48 and a second brake 50.

The output of the travel motor 16 is transferred to the output shaft 26 after the velocity is reduced to low or high by the activation of one of the first brake 48 and the second brake 50. That is, when the velocity is reduced to low, the second ring gear 44 having a greater number of teeth than the rear sun gear 38 is fixed by the second brake 50 so that the output of the travel motor 16 is transferred to the output shaft 26 via the rear sun gear 38, the long pinion gear 40, and the second carrier 46. On the other hand, when the velocity is reduced to high, the front sun gear 36 having a smaller number of teeth than the rear sun gear 38 is fixed by the first brake 48 so that the output of the travel motor 16 is transferred to the output shaft 26 via the rear sun gear 38, the long pinion gear 40, the short pinion gear 42, and the second carrier 46. The travel motor 16 is a three-phase AC motor, and can also be used as a generator, that is, used for the regeneration of electric power during braking.

The rotation of the engine 12 is transferred to the output shaft 26 and to the generator 14 via the power divider 22. The generator 14 is capable of stepless control of the revolution number per unit time. The generator 14 also serves to optimize the operating point of the engine 12 to obtain a higher fuel mileage and greater performance by controlling the rate of revolution. Here, returning to FIG. 1, the rotation of the output shaft 26 is transmitted to the rear wheels 56 which are driving wheels via a propeller shaft 52 and a differential gear 54, so that the rear wheels 56 are driven.

Figure 3:
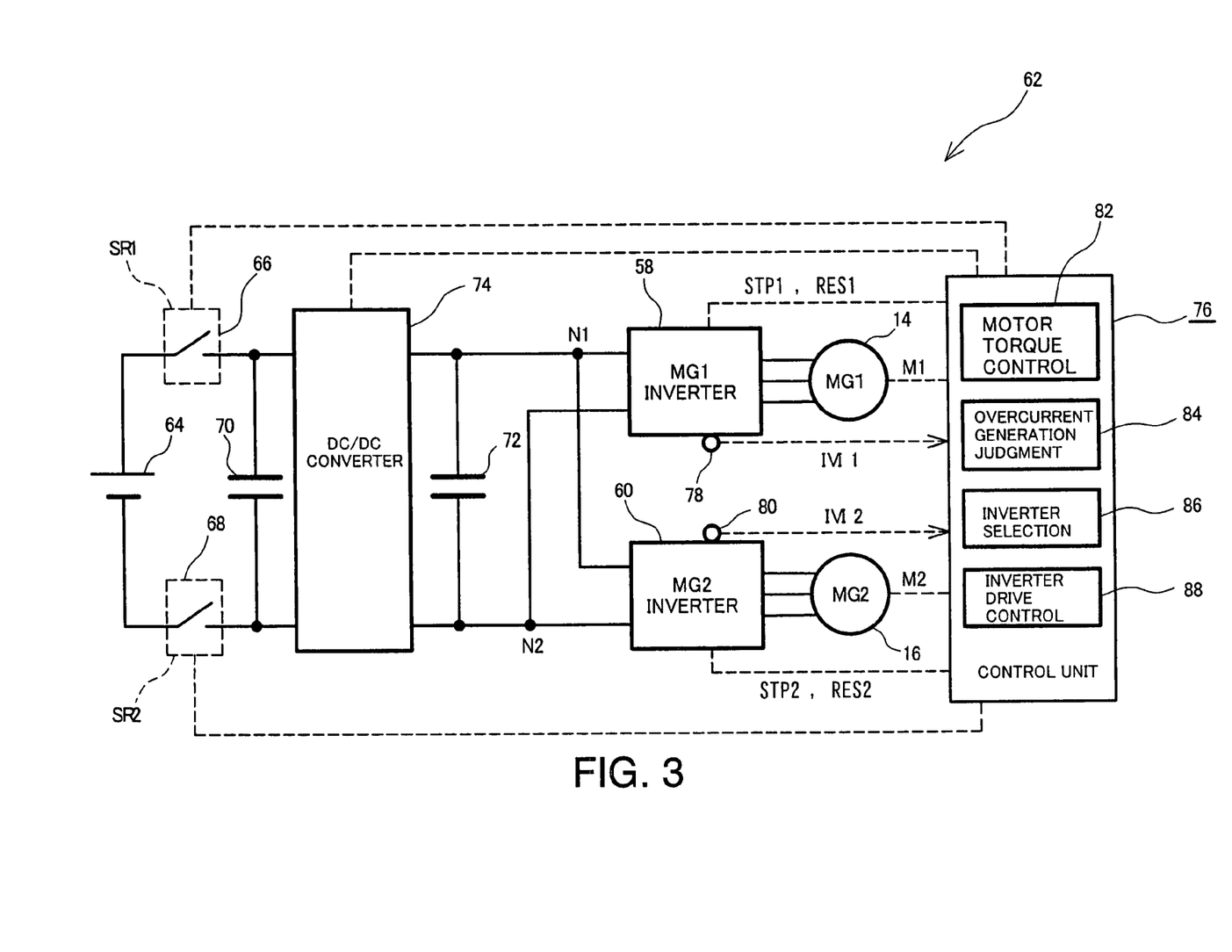
FIG. 3 is a block diagram showing an electric load device having the generator (MG1) and the travel motor (MG2) in the hybrid vehicle in FIG. 1.

FIG. 3 is a block diagram showing an electric load device 62 for enabling the in the above-described hybrid vehicle 10 (FIG. 1) in which one or both of the generator (MG1) 14 and the travel motor (MG2) 16 is driven and the vehicle 10 can be driven when an overcurrent is generated in a generator inverter 58 or a travel motor inverter 60. The basic constitution of the electric load device 62 shown in FIG. 3 is similar to the basic constitution of an electric load device described in Japanese Patent Publication Laid-open No. 2004-112883.

The electric load device 62 includes a DC power source 64, system relays 66, 68, a first condenser 70 and a second condenser 72, a DC/DC converter 74, the generator inverter 58, the travel motor inverter 60, a control unit 76, the generator 14 and the travel motor 16.

The DC/DC converter 74 includes, although not shown, a reactor, two switching elements such as transistors, and two diodes. The DC/DC converter 74 steps up a DC voltage supplied from the first condenser 70 so that the DC voltage can be supplied to the second condenser 72. The DC/DC converter 74 has the function to, in response to a signal sent from the control unit 76, step up the DC voltage in accordance with the 'on' time of the switching elements, and supply the voltage to the second condenser 72. The DC/DC converter 74 also has the function to, in response to a signal from the control unit 76, step down a DC voltage supplied from one or both of the generator inverter 58 and the travel motor inverter 60 via the second condenser 72 to charge the DC power source 64 with the DC voltage.

The DC power source 64 is a secondary battery such as a nickel-metal-hydride battery or lithium ion battery. The DC power source 64 can be combined with a fuel cell. The system relays 66, 68 are turned on or off by a signal from the control unit 76. That is, in accordance with the turning on of an unshown start switch, the system relays 66, 68 are turned on by the control unit, and a circuit of the electric load device 62 is made. Moreover, in accordance with the turning off of the start switch, the system relays 66, 68 are turned off, and the circuit is broken.

The first condenser 70 smoothes the DC voltage supplied from the DC power source 64, and supplies the smoothed DC voltage to the DC/DC converter 74. The second condenser 72 smoothes the DC voltage from the DC/DC converter 74, and supplies the smoothed DC voltage to the generator inverter 58 and the travel motor inverter 60 via nodes N1, N2.

The generator inverter 58 and the travel motor inverter 60 each have unshown arms of U, V, and W phases. Each arm has two switching elements (not shown) such as IGBTs or transistors connected in series. The middle point of each arm is connected to each of three-phase coils of the generator 14 or the travel motor 16. The generator inverter 58 and the travel motor inverter 60 are connected in parallel to the DC power source 64.

When supplied with the DC voltage from the second condenser 72, the generator inverter 58 converts the DC voltage to an AC voltage in accordance with a signal corresponding to a torque command value from the control unit 76 to drive the generator 14. The generator inverter 58 converts an AC voltage generated by the generator 14 driven by the engine 12 (FIG. 2) via the power divider 22 into a DC voltage in accordance with a signal from the control unit 76 (FIG. 3), and supplies the converted DC voltage to the DC/DC converter 74 via the second condenser 72. Moreover, the generator inverter 58 stops driving in response to a drive stop signal STP1 from the control unit 76, and resumes driving in response to a drive resumption signal RES1 from the control unit 76.

On the other hand, when supplied with a DC voltage from the second condenser 72, the travel motor inverter 60 converts the DC voltage to an AC voltage in accordance with a signal corresponding to a torque command value from the control unit 76 to drive the travel motor 16. During regenerative braking of the hybrid vehicle, the travel motor inverter 60 converts an AC voltage generated by the travel motor 16 to a DC voltage in accordance with a signal from the control unit 76, and supplies the converted DC voltage to the DC/DC converter 74 via the second condenser 72. Moreover, the travel motor inverter 60 halts driving in response to a drive stop signal STP2 from the control unit 76, and resumes driving in response to a drive resumption signal RES2 from the control unit 76.

Furthermore, inverter current sensors 78, 80 which are current detection unit are provided in the generator inverter 58 and the travel motor inverter 60, respectively. For example, one inverter current sensor 78, 80 can be provided to each arm of the inverters 58, 60 so that a current running through each arm is detected. Detected current values IVI1, IVI2 detected by the inverter current sensors 78, 80 are input to the control unit 76.

The control unit 76 is a motor controller, and is a microcomputer having a CPU, a memory, etc. Values M1, M2 of motor currents running in the respective phases of the generator 14 or the travel motor 16 are input to the control unit 76 by unshown motor current sensors provided in the generator 14 and the travel motor 16. Moreover, also input to the control unit 76 are a DC voltage V1 which is detected by an unshown voltage sensor and which is output from the DC power source 64, an output voltage V2 of the DC/DC converter 74 detected by another unshown voltage sensor, that is, voltages input to the inverters 58, 60, and a torque command value and a motor rotational speed from an unshown external ECU.

The control unit 76 has motor torque control unit 82, overcurrent generation judgment unit 84, inverter selection unit 86, and inverter drive control unit 88. In accordance with the motor current value M1 (or M2), the DC voltage V1 from the DC power source 64, the output voltage V2 of the DC/DC converter 74, the torque command value and the motor rotational speed, the motor torque control unit 82 generates a signal for controlling the switching element of the inverter 58 (or 60) when the generator 14 or the travel motor 16 is to be driven. Then, the motor torque control unit 82 outputs the signal to the inverter 58 (or 60).

Moreover, when the generator 14 or the travel motor 16 is to be driven by the inverter 58 (or 60), the control unit 76 generates a signal for controlling the switching element of the DC/DC converter 74, in accordance with the motor current value M1 (or M2), the DC voltage V1 from the DC power source 64, the output voltage V2 of the DC/DC converter 74, the torque command value and the motor rotational speed. Then, the control unit 76 outputs the signal to the DC/DC converter 74.

The control unit 76 also generates a signal for converting the AC voltage generated by the generator 14 or the travel motor 16 to a DC voltage, and outputs the signal to the inverter 58 (or 60). In the meantime, the control unit 76 generates a signal for controlling the DC/DC converter 74 to step down the DC voltage from the inverter 58 (or 60) and then charge the DC power source 64. Then, the control unit 76 outputs the signal to the DC/DC converter 74.

Furthermore, in accordance with the detected current values IVI1, IVI2 from the inverter current sensors 78, 80 in the generator inverter 58 or the travel motor inverter 60, the overcurrent generation judgment unit 84 judges whether the overcurrent is generated in the generator inverter 58 or the travel motor inverter 60, that is, whether the detected current values IVI1, IVI2 are equal to or more than a preset given value.

Moreover, when it is judged by the overcurrent generation judgment unit 84 that the overcurrent is generated in one of the generator inverter 58 or the travel motor inverter 60, the inverter selection unit 86 selects the other inverter as the inverter to be driven. Further, the inverter drive control unit 88 stops the driving of the one inverter 58 (or 60), and drives the selected other inverter 60 (or 58) without judging whether an input voltage to the inverters 58, 60, that is, a voltage across the nodes N1, N2 is stable. Thus, the rear wheels 56 (FIG. 1) are driven by the driving of the travel motor 16 or the generator 14 corresponding to the selected other inverter 60 (or 58). That is, the inverter drive control unit 88 (FIG. 3) only drives the selected one 60 (or 58) of the two inverters 58, 60, and thereby controls the inverter 60, 58 so that the travel motor 16 or the generator 14 corresponding to the selected inverter 60 (or 58) may be driven.

More specifically, when the number of times that the overcurrent is generated in one inverter 58 (or 60) is less than a preset number of times K (K is an integral number equal to or more than 1), the inverter selection unit 86 (FIG. 3) determines that both inverters 58, 60 should be driven. In such a case, the inverter drive control unit 88 stops both the generator inverter 58 and the travel motor inverter 60, and performs load factor limiting control to decrease a motor load factor MR associated with the generator 14 and the travel motor 16 driven by both the inverters 58, 60. The above motor load factor MR is a ratio of an allowable maximum torque command value of the generator 14 or the travel motor 16 to the generatable maximum torque of the generator 14 or the travel motor 16. For example, when the motor load factor MR is, for example, 100%, the load factor limiting control decreases the motor load factor MR to, for example, 80% by a given percentage (e.g., 20%), that is, decreases the allowable maximum torque command value of the generator 14 or the travel motor 16. In such a case, a current command value corresponding to the torque command value can be decreased instead of decreasing the torque command value of the generator 14 or the travel motor 16. Alternatively, the motor load factor MR can also be decreased by the increase of the temperature which is detected by a temperature sensor for detecting the temperatures of the inverters 58, 60 and which corresponds to the generation of the overcurrent in the inverters 58, 60.

Then, after decreasing the motor load factor MR associated with both the inverters 58, 60 by a given percentage, the inverter drive control unit 88 resumes the driving of both the inverters 58, 60 as long as no generation of the overcurrent is detected, that is, when it is determined the overcurrent has disappeared. When the overcurrent is generated in one inverter 58 (or 60) a predetermined number of times K or more in succession, that is, repetitively, the inverter selection unit 86 selects the other inverter 60 (or 58) as the inverter to be driven. In such a case, the inverter drive control unit 88 stops both the inverters 58, 60, and decreases the motor load factor MR associated with the generator 14 and the travel motor 16 driven by both the inverters 58, 60. Then, should no generation of the overcurrent be detected, that is, if it is determined that the overcurrent has disappeared, the inverter drive control unit 88 only resumes the driving of the other of the inverters 58, 60, so that the rear wheels 56 of the hybrid vehicle 10 (FIG. 1) are driven by the driving of the travel motor 16 or the generator 14 corresponding to the other inverter 60 (or 58).

Figure 4:
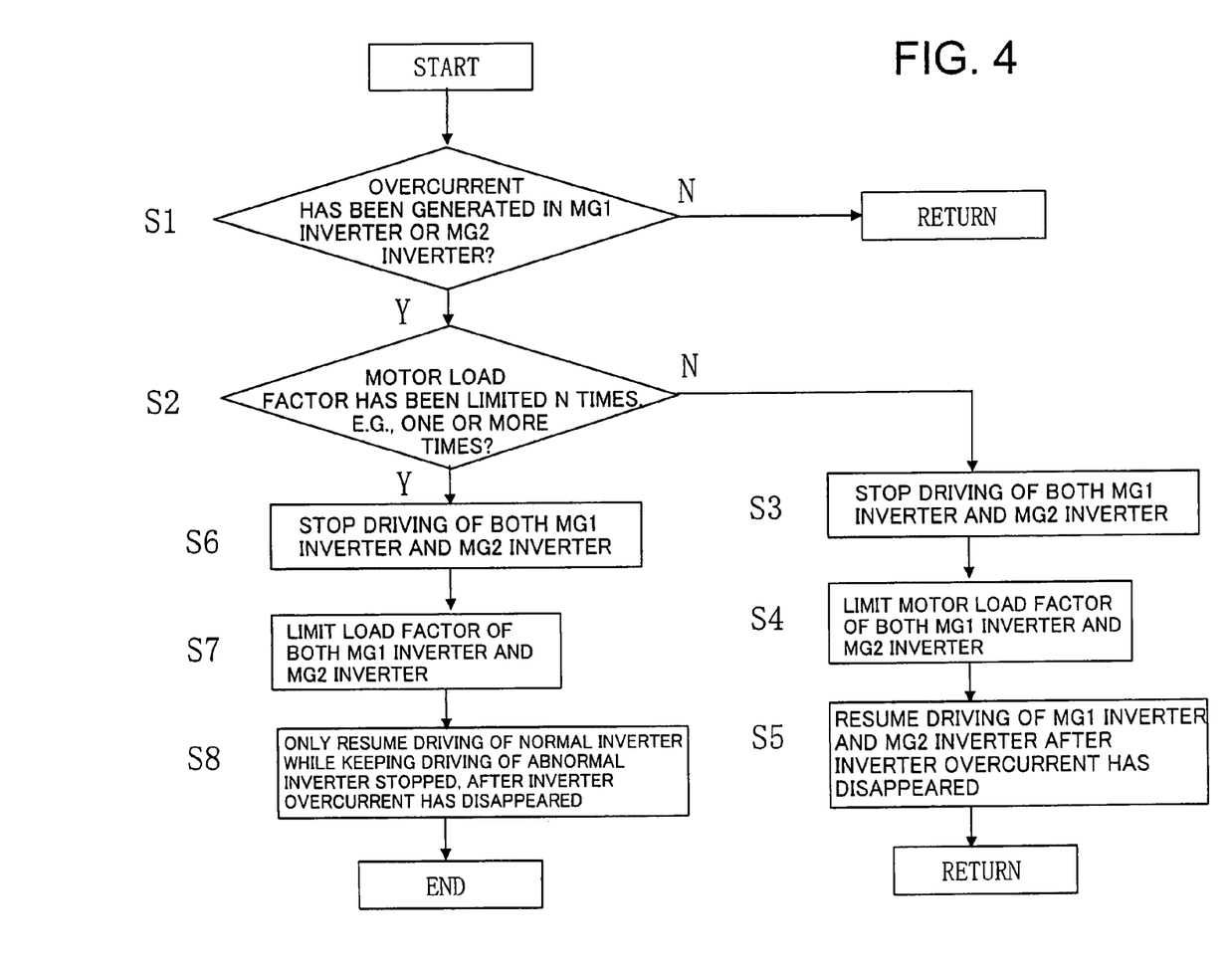
FIG. 4 is a flowchart illustrating processing in a case wherein an overcurrent is generated in a generator inverter or a travel motor inverter.

FIG. 4 is a flowchart for explaining processing in an example wherein an overcurrent is generated in the generator inverter 58 or the travel motor inverter 60. First, in step S1, the overcurrent generation judgment unit 84 judges whether an overcurrent is generated in the generator inverter 58 or the travel motor inverter 60 on the basis of the detected current values IVI1, IVI2 from the inverter current sensors 78, 80 (FIG. 3). When it is judged that an overcurrent is generated, the inverter selection unit 86 (FIG. 3) next judges in step S2 in FIG. 4 whether the motor load factor MR has been limited, that is, decreased a predetermined number of times N or more, N being any integer. When it is judged in step S2 in FIG. 4 that the motor load factor MR has been limited less than the predetermined number of times N, that is, when the judgment in step S2 is No, the process moves to step S3. The inverter drive control unit 88 (FIG. 3) stops the driving of both the generator inverter 58 and the travel motor inverter 60 (FIG. 3), that is, the drive stop signals STP1, STP2 for blocking, for example, gates are output to both the inverters 58, 60 by the inverter selection unit 86.

Then, in step S4 in FIG. 4, the inverter drive control unit 88 (FIG. 3) performs the load factor limiting control to decrease the motor load factor MR associated with both the generator 14 and the travel motor 16 by a given percentage. Then, in step S5 in FIG. 4, if the overcurrent generated in one inverter 58 (or 60) has disappeared, that is, if the detected current values IVI1, IVI2 from the inverter current sensors 78, 80 are less than a predetermined value, the inverter drive control unit 88 (FIG. 3) resumes driving both the generator inverter 58 and the travel motor inverter 60, that is, outputs the drive resumption signals RES1, RES2 to both of the inverters 58, 60. Then, the process returns to step S1 in FIG. 4.

Otherwise, when in step S2 the inverter selection unit 86 (FIG. 3) judges that the motor load factor MR has already been limited the predetermined number of times N or more, that is, when the judgment in step S2 in FIG. 4 is Yes, the inverter selection unit 86 selects the other inverter 60 (or 58) (FIG. 3) as the inverter to be driven. Then, the process moves to step S6. The inverter drive control unit 88 stops the driving of both the generator inverter 58 and the travel motor inverter 60, that is, the drive stop signals STP1, STP2 for blocking, for example, the gates are output to both inverters 58, 60 by the inverter drive control unit 88.

Then, in step S7 in FIG. 4, the inverter drive control unit 88 (FIG. 3) further decreases the motor load factor MR for the generator 14 and the travel motor 16 by a given percentage. Then, in step S8 in FIG. 4, on condition that the overcurrent generated in one inverter 58 (or 60) has disappeared, that is, if the detected current values IVI1, IVI2 from the inverter current sensors 78, 80 are less than a predetermined value, the inverter drive control unit 88 (FIG. 3) keeps stopped the driving of only one 58 (or 60) of the generator inverter 58 and the travel motor inverter 60 in which the overcurrent is generated. Meanwhile, the inverter drive control unit 88 only resumes driving the other inverter 60 (or 58) selected by the inverter selection unit 86, which is a normal (normally-functioning) inverter without any overcurrent. That is, the drive resumption signal RES2 (or RES1) is only output to the other inverter 60 (or 58) by the inverter drive control unit 88. Thus, only the normal inverter 60 (or 58) is driven so that the travel motor 16 or the generator 14 corresponding to the normal inverter 60 (or 58) is driven. Consequently, the hybrid vehicle 10 is able to continue running.

Figure 5:
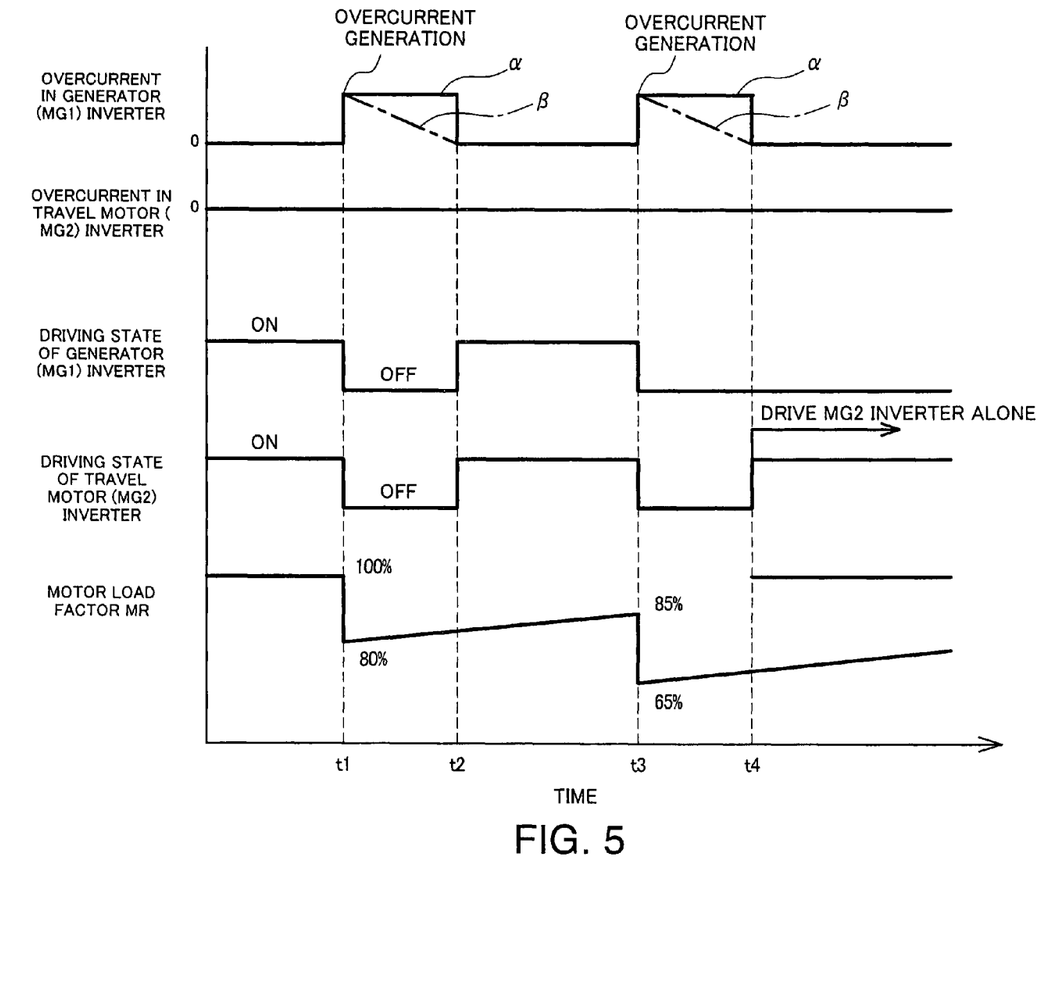
FIG. 5 is a graph illustrating examples of overcurrent generation state in the generator inverter and the travel motor inverter, driving state (on or off) of the generator inverter and the travel motor inverter, and motor load factor MR over time, in a case wherein the predetermined number N in step S2 shown in FIG. 4 is 1.

FIG. 5 is a graph showing examples of the state of overcurrent generation in the generator inverter 58 and the travel motor inverter 60; the driving state, that is, the 'on' or 'off' state of the generator inverter 58 and the travel motor inverter 60; and the motor load factor MR over time, in a situation wherein the predetermined number N in step S2 in FIG. 4 is 1. At a time t1, if the overcurrent is generated in, for example, the generator inverter 58, the inverter drive control unit 88 halts the driving of both the generator inverter 58 and the travel motor inverter 60, and decreases the motor load factor MR by a given percentage, for example, by 20% from, for example, 100% to 80%.

Then, at a time t2, if the overcurrent generated in the generator inverter 58 has disappeared, the inverter drive control unit 88 resumes the driving of both the generator inverter 58 and the travel motor inverter 60. In addition, the generation of the overcurrent disappears not only in a stepwise decreasing pattern as indicated by a full line α but also as indicated by a dashed-dotted line so that the current gradually reaches 0.

Then, at a time t3, if the overcurrent is generated again due to, for example, a breakdown of the generator inverter 58, the inverter drive control unit 88 again stops the driving of both the generator inverter 58 and the travel motor inverter 60, and decreases the motor load factor MR by a given percentage, for example, by 20% from, for example, 85% to 65%. That is, after the driving of the inverters 58, 60 has been stopped at the time t1, the motor load factor MR gradually increases at a predetermined restoration rate, that is, predetermined increase rate over time. In some cases, however, the motor load factor MR is not restored to 100% at the point where the overcurrent is generated again, for example, at the time t3. In such cases, the motor load factor MR at that point is further decreased by a given percentage (e.g., by 20%).

Then, at a time t4, if the overcurrent generated in the generator inverter 58 has disappeared, the inverter drive control unit 88 only keeps the driving of the generator inverter 58 stopped, and only resumes the driving of the travel motor inverter 60, thereby driving the rear wheels 56 of the hybrid vehicle 10 (FIG. 1). Thus, in the present embodiment, even if the control unit 76 (FIG. 3) judges that an overcurrent is generated in one of the generator inverter 58 and the travel motor inverter 60, the motor load factor MR associated with the generator 14 and the travel motor 16 corresponding to both the inverters 58, 60 is limited, that is, decreased at least once, and then both the inverters 58, 60 are restored. Therefore, the maximum current corresponding to the maximum torque which can be generated by the generator 14 or the travel motor 16 does not pass through one inverter 58 (or 60) in which the overcurrent is generated. Even if the motor load factor MR is decreased, the overcurrent may be generated in one inverter 58 (or 60), and the motor load factor MR may be limited a predetermined number of times (N+1), for example, two or more times. In this case, one inverter 58 (or 60) in which the overcurrent is generated is not used, and only the other, normally-functioning inverter 60 (or 58) is used to enable the running of the hybrid vehicle 10. Thus, transient generation of an overcurrent can be permitted to prevent the driving of the inverters 58, 60 from being unnecessarily stopped when both the inverters 58, 60 are normal.

In such a case as shown in FIG. 5, the travel motor inverter 60 is only driven, of both the inverters 58, 60, to drive the rear wheels 56 of the hybrid vehicle 10. However, in this case, the rear wheels 56 can also be driven, for example, even if the driving of the engine 12 (FIG. 1, FIG. 2) is kept stopped. To explain this, FIG. 6 shows a collinear graph indicating, by way of example, the relationships among the rotational speeds of the sun gear 28, the carrier 34 and the ring gear 30 of the planetary gear mechanism configuring the power divider 22 (FIG. 2).

Figure 6:
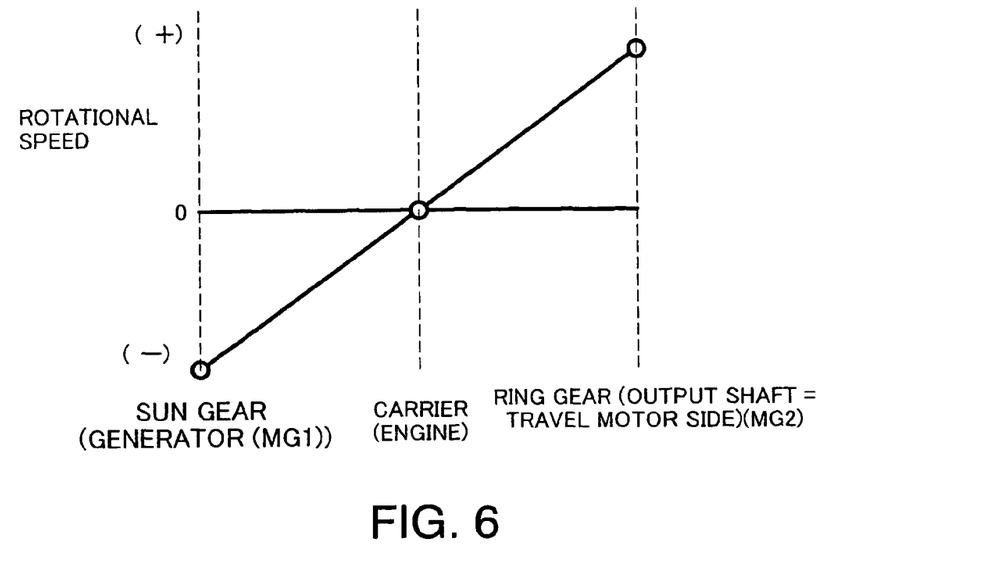
FIG. 6 is a graph showing example relationships among the rotational speed of a sun gear, a carrier, and a ring gear of a planetary gear mechanism configuring a power divider, in a case wherein the travel motor alone is driven to enable running of the hybrid vehicle.

As shown in FIG. 6, the rotational speeds of the sun gear 28 (FIG. 2), the carrier 34 (FIG. 2) and the ring gear 30 (FIG. 2) have a collinear relationship when the carrier 34 is disposed between the sun gear 28 and the ring gear 30 in accordance with the ratio of the number of teeth for the ring gear 30 and the sun gear 28. In FIG. 6, (+) represents forward rotation, and (−) represents reverse rotation.

Furthermore, in the example shown in FIG. 6, the driving of the engine 12 (FIG. 2) is stopped, and the rotational speed of the carrier 34 coupled to the crank shaft 18 of the engine 12 is 0. In this case, the ring gear 30 coupled to the output shaft 26 on the side of the travel motor 16 rotates forward by the driving of the travel motor 16 being driven by the travel motor inverter 60, while the sun gear 28 rotates in the reverse direction. That is, the sun gear 28 is not driven by the generator 14, but forcibly rotated by the rotation of the ring gear 30. In such a case, the output shaft 26 rotates, so that the rear wheels 56 of the hybrid vehicle 10 can be driven.

Figure 7:
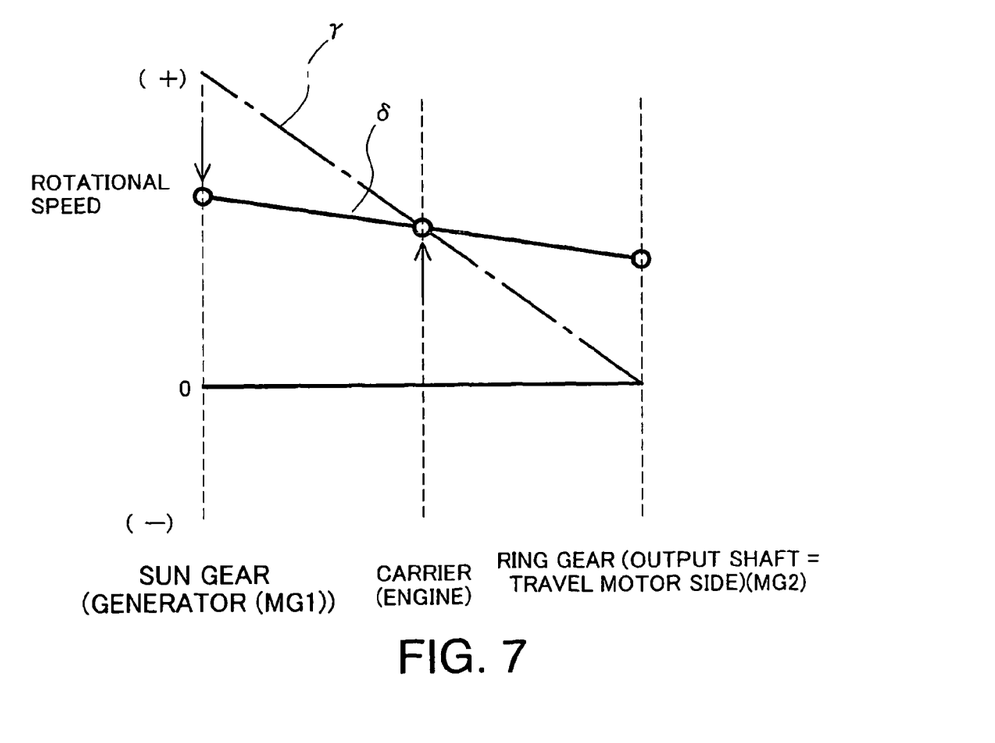
FIG. 7 is a graph showing an example wherein the generator and the engine alone are driven to enable running of the hybrid vehicle in a similar manner.

FIG. 7 is a collinear graph showing an example wherein, of the generator inverter 58 (FIG. 3) and the travel motor inverter 60, only the generator inverter 58 is driven to enable the driving of the rear wheels 56 of the hybrid vehicle 10 (FIG. 1). In this case, the rotational speeds of the sun gear 28 (FIG. 2), the carrier 34 and the ring gear 30 have a collinear relationship, as in FIG. 6. In the example shown in FIG. 7, the driving of the travel motor inverter 60 (FIG. 3) is stopped, and the travel motor 16 on the side of the output shaft 26 coupled to the ring gear 30 (FIG. 2) is not driven by the travel motor inverter 60 (FIG. 3). However, the generator 14 and the engine 12 (FIG. 2) are driven to rotate the sun gear 28 and the carrier 34 forward (FIG. 7). Moreover, as indicated by the broken line γ in FIG. 7, the output shaft 26 does not rotate and the hybrid vehicle 10 can not be run when the rotational speed of the ring gear 30 (FIG. 2) is 0. Thus, the signal sent from the control unit 76 to the generator inverter 58 (FIG. 3) is controlled to reduce the rotational speed of the generator 14 so that the relationship among the rotational speeds of the sun gear 28 (FIG. 2), the carrier 34, and the ring gear 30 may be as indicated by the solid line δ in FIG. 7. As a result, although the travel motor 16 (FIG. 2) is not driven, the ring gear 30 rotates forward as if rotated together, and the rear wheels 56 of the hybrid vehicle 10 can be driven by the rotation of the output shaft 26. That is, the hybrid vehicle 10 can be run by driving just the travel motor inverter 60 as shown in FIG. 6, or by driving only the generator inverter 58 among the generator inverter 58 and the travel motor inverter 60 as shown in FIG. 7.

According to the present embodiment, the hybrid vehicle 10 includes the generator inverter 58 and the travel motor inverter 60; the overcurrent generation judgment unit 84 for judging whether an overcurrent is generated in one 58 (or 60) of the inverters 58, 60 based on the detected current values IVI1, IVI2 for the inverters 58, 60; the inverter selection unit 86 for selecting an inverter to be driven when the overcurrent is generated in one inverter 58 (or 60); and the inverter drive control unit 88 for controlling the inverters 58, 60 to only drive the selected other 60 (or 58) of the two inverters 58, 60 so that the travel motor 16 or the generator 14 corresponding to the selected inverter 60 (or 58) may be driven. When the overcurrent is generated in one inverter 58 (or 60), the rear wheels 56 (FIG. 1) are driven by the travel motor 16 or the generator 14 corresponding to the selected inverter 58 (or 60). This enables effective safe driving for evacuation of the hybrid vehicle 10 even when the overcurrent is generated in one inverter 58 (or 60).

Furthermore, the hybrid vehicle 10 includes the power divider 22 configured by the planetary gear mechanism in which the pinion gears 32 is toothed between the sun gear 28 (FIG. 2) and the ring gear 30; the engine 12; and the output shaft 26 (FIG. 2) for outputting power toward the rear wheels 56 (FIG. 1). The generator 14 is coupled to the sun gear 28. The rotary shaft of the engine 12 is coupled to the carrier 34 which supports the pinion gears 32. The output shaft 26 provided with auxiliary power by the travel motor 16 is coupled to the ring gear 30. When an overcurrent is generated in one 58 (or 60) of the generator inverter 58 and the travel motor inverter 60, the inverter selection unit 86 selects the other inverter 60 (or 58) as the inverter to be driven. Thus, if the corresponding generator 14 or travel motor 16 is driven by the generator inverter 58 or the travel motor inverter 60, power can be provided to the output shaft 26. This enables effective safe driving of the hybrid vehicle 10 for evacuation, regardless of whether the overcurrent is generated in one 58 (or 60) of the generator inverter 58 and the travel motor inverter 60.

Still further, when the overcurrent is generated in one inverter 58 (or 60) a predetermined number of times K or more in succession, that is, repetitively, the inverter drive control unit 88 keeps one inverter 58 (or 60) stopped. When the number of times that the overcurrent is generated in one inverter 58 (or 60) is less than a predetermined number of times K, that is, the overcurrent is repetitively generated less than a predetermined number of times, or generated only once, the inverter drive control unit 88 stops both the generator inverter 58 and the travel motor inverter 60, and decreases the motor load factor MR associated with the generator 14 and the travel motor 16 driven by both the inverters 58, 60, and then resumes the driving of both the inverters 58, 60. Thus, after the generation of the overcurrent in one inverter 58 (or 60), the driving of one inverter 58 (or 60) can be resumed when the number of times that the overcurrent is generated is less than a predetermined number of times K. This makes it possible to provide an opportunity for the one inverter 58 (or 60) to return to normal when one inverter 58 (or 60) is not broken, and effectively prevents unnecessary stop of driving of the normal inverter 60 (or 58). For example, when it is judged that the overcurrent is generated in one inverter 58 (or 60) due to, for example, a transient trouble in the inverter current sensors 78, 80, one inverter 58 (or 60) is stopped, and then restored. Thus is makes it possible to preserve the possibility that both the inverters 58, 60 can be driven normally at a later point.

In addition, in the present embodiment, when the overcurrent is generated in one inverter 58 (or 60) a predetermined number of times K or more in succession, the inverter drive control unit 88 keeps one inverter 58 (or 60) stopped. When the overcurrent is generated in one inverter 58 (or 60) is less than a predetermined number of times K, the inverter drive control unit 88 stops both the inverters 58, 60, and decreases the motor load factor MR associated with the generator 14 and the travel motor 16 driven by both inverters 58, 60, and then resumes the driving of both inverters 58, 60. However, the present invention is not limited to such a constitution. For example, when the motor load factor MR after limitation of the load factor is less than a motor load factor for minimum acceleration performance MR2 which is greater by a predetermined value or predetermined ratio than a motor load factor for poor acceleration performance MR1 corresponding to insufficient acceleration performance of the hybrid vehicle 10, the driving of one inverter 58 (or 60) can be kept stopped, while the corresponding generator 14 or travel motor 16 can be driven by the other inverter 60 (or 58). When the motor load factor MR after limitation of the load factor is more than the motor load factor for minimum acceleration performance MR2, the driving of both the generator inverter 58 and the travel motor inverter 60 is stopped, and the motor load factor MR associated with the generator 14 and the travel motor 16 driven by both the inverters 58, 60 is decreased, and then the driving of both the inverters 58, 60 can be resumed.

Furthermore, although the power provided to the output shaft 26 (FIG. 1) is transferred directly to the propeller shaft 52 in the present embodiment, the electric vehicle in the present invention is not limited to such a constitution. For example, a transmission can be provided in a power transmission path between the output shaft 26 and an axle coupled to the rear wheels 56. Moreover, the electric vehicle according to the present invention is not limited to the FR vehicle, and can be, for example, a front engine front-wheel-drive vehicle (FF vehicle) or a four-wheel drive vehicle (4WD vehicle).

Still further, the present invention is not limited to cases wherein the power of the travel motor 16 is provided to the output shaft 26 via the reduction gear unit 24 which reduces the velocity to low or high. For example, the power of the travel motor 16 can also be provided to the output shaft 26 via a one-speed reduction gear unit, that is, a reduction gear unit only composed of a pair of gears. Alternatively, the power can also be provided to the output shaft 26 by a travel motor disposed coaxially with the output shaft 26.

The invention claimed is:

1. An electric vehicle including:
a plurality of inverters which are connected to a plurality of motors to drive wheels and which are connected in parallel to a DC power source;
judgment unit for judging whether an overcurrent is generated in one of the plurality of inverters in accordance with detected current values for the plurality of inverters;
selection unit for selecting an inverter to be driven when the overcurrent is generated in one of the inverters; and
inverter drive control unit for controlling the inverters,
wherein, when it is judged that an overcurrent is generated in one of the plurality of inverters and a number of successive occurrences of overcurrent generation is less than a predetermined number, the inverter drive control unit stops the driving of all of the inverters to decrease a motor load factor, and then resumes the driving of all of the inverters, the motor load factor being a ratio of an allowable maximum torque command value of the motors to a generatable maximum torque of all of the motors, and when the overcurrent is generated in one of the plurality of inverters and the number of successive occurrences of overcurrent generation is the predetermined number or more, the inverter drive control unit stops the driving of all of the inverters, and then resumes the driving of only the inverter selected among the plurality of inverters to resume the driving of the motor corresponding to the selected inverter, whereby the wheels are driven.

2. The electric vehicle according to claim 1, wherein
when the overcurrent is generated in one of the inverters, the inverter drive control unit decreases the motor load factor of all of the motors, and, when the overcurrent is generated in one of the plurality of inverters and the number of occurrences of the limited motor load factor is less than a predetermined number of limit times, it is assumed that the number of successive occurrences of overcurrent generation is less than the predetermined number, and the inverter drive control unit stops the driving of all of the inverters to decrease the motor load factor of all of the motors, and then resumes the driving of all of the inverters, and, when the overcurrent is generated in one of the plurality of inverters and the number of limit times of the motor load factor is the predetermined number of limit times or more, it is assumed that the number of successive occurrences of overcurrent generation is the predetermined number or more, and the inverter drive control unit stops the driving of all of the inverters, and then resumes the driving of only the inverter selected among the plurality of inverters to resume the driving of the motor corresponding to the selected inverter, whereby the wheels are driven.

3. The electric vehicle according to claim 2, wherein
the plurality of motors are a first motor generator and a second motor generator,
the plurality of inverters are a first motor generator inverter and a second motor generator inverter,
the electric vehicle further including:
a planetary gear mechanism in which a pinion gear is toothed between a sun gear and a ring gear;
an engine; and
an output shaft which outputs power toward the wheels,
the first motor generator being coupled to the sun gear,
a rotary shaft of the engine being coupled to a member which supports the pinion gear,
an output shaft to which auxiliary power is imparted by the second motor generator being coupled to the ring gear,
the selection unit being configured to select, when the overcurrent is generated in one of the first motor generator inverter and the second motor generator inverter and the number of successive occurrences of overcurrent generation is the predetermined number or more, the other inverter among the first motor generator inverter and the second motor generator inverter, as the inverter to resume driving.

4. The electric vehicle according to claim 1, wherein
the plurality of motors are a first motor generator and a second motor generator,
the plurality of inverters are a first motor generator inverter and a second motor generator inverter,
the electric vehicle further including:
a planetary gear mechanism in which a pinion gear is toothed between a sun gear and a ring gear;
an engine; and
an output shaft which outputs power toward the wheels,
the first motor generator being coupled to the sun gear,
a rotary shaft of the engine being coupled to a member which supports the pinion gear,
an output shaft to which auxiliary power is imparted by the second motor generator being coupled to the ring gear,
the selection unit being configured to select, when the overcurrent is generated in one of the first motor generator inverter and the second motor generator inverter and the number of successive occurrences of overcurrent generation is the predetermined number or more, the other inverter among the first motor generator inverter and the second motor generator inverter, as the inverter to resume driving.

5. An electric vehicle including:
a plurality of inverters which are connected to a plurality of motors to drive wheels and which are connected in parallel to a DC power source;
judgment unit for judging whether an overcurrent is generated in one of the plurality of inverters in accordance with detected current values for the plurality of inverters;
selection unit for selecting an inverter in which the overcurrent is not generated as an inverter to be driven when the overcurrent is generated in one of the inverters; and
inverter drive control unit for controlling the inverters,
wherein, when it is judged that an overcurrent is generated in one of the plurality of inverters and a number of occurrences of overcurrent generation before the generation of the overcurrent is less than a predetermined number, the inverter drive control unit stops the driving of all of the inverters to decrease a motor load factor, and then resumes the driving of all of the inverters, the motor load factor being a ratio of an allowable maximum torque command value of the motors to a generatable maximum torque of all of the motors, and when the overcurrent is generated in one of the plurality of inverters and the number of occurrences of overcurrent generation before the generation of the overcurrent is the predetermined number or more, the inverter drive control unit stops the driving of all of the inverters, and then resumes the driving of only the inverter selected among the plurality of inverters to resume the driving of the motor corresponding to the selected inverter, whereby the wheels are driven.

6. The electric vehicle according to claim 5, wherein
the plurality of motors are a first motor generator and a second motor generator;
the plurality of inverters are a first motor generator inverter and a second motor generator inverter,
the electric vehicle further including:
a planetary gear mechanism in which a pinion gear is toothed between a sun gear and a ring gear;
an engine; and
an output shaft which outputs power toward the wheels,
the first motor generator being coupled to the sun gear;
a rotary shaft of the engine being coupled to a member which supports the pinion gear,
an output shaft to which auxiliary power is imparted by the second motor generator being coupled to the ring gear,
the selection unit being configured to select, when the overcurrent is generated in one of the first motor generator inverter and the second motor generator inverter and the number of occurrences of overcurrent generation before the generation of the overcurrent is the predetermined number or more, the other inverter among the first motor generator inverter and the second motor generator inverter, as the inverter to resume driving.

* * * * *